United States Patent
Muehl et al.

(10) Patent No.: US 7,248,168 B2
(45) Date of Patent: Jul. 24, 2007

(54) ACCESSING DATA TAG INFORMATION USING DATABASE QUERIES

(75) Inventors: Gordon Muehl, Oestringen (DE); Karsten Hinrichs, Ludwigshafen (DE); Jens Staeck, Sandhausen (DE)

(73) Assignee: SAP Aktiengesellschaft, Walldorf (DE)

(*) Notice: Subject to any disclaimer, the term of this patent is extended or adjusted under 35 U.S.C. 154(b) by 410 days.

(21) Appl. No.: 10/873,837

(22) Filed: Jun. 21, 2004

(65) Prior Publication Data

US 2005/0280540 A1    Dec. 22, 2005

(51) Int. Cl.
*G08B 13/14* (2006.01)

(52) U.S. Cl. .............................. 340/572.4; 340/10.41; 707/1

(58) Field of Classification Search ............. 340/572.1, 340/572.4, 10.41, 10.4, 10.33, 10.1, 825.49, 340/539.13; 707/1, 3, 8; 235/384, 454; 711/118, 144; 709/224, 223
See application file for complete search history.

(56) References Cited

U.S. PATENT DOCUMENTS

| | | | | |
|---|---|---|---|---|
| 5,481,519 A | * | 1/1996 | Hosoya | ................... 369/53.21 |
| 5,870,559 A | * | 2/1999 | Leshem et al. | ............. 709/224 |
| 5,887,176 A | * | 3/1999 | Griffith et al. | .............. 713/320 |
| 6,172,596 B1 | | 1/2001 | Cesar et al. | |
| 6,199,141 B1 | * | 3/2001 | Weinreb et al. | ............. 711/118 |
| 6,400,272 B1 | | 6/2002 | Holtzman et al. | |
| 2003/0141985 A1 | | 7/2003 | Haller et al. | |

FOREIGN PATENT DOCUMENTS

WO    WO 00/07121    2/2000

\* cited by examiner

*Primary Examiner*—Anh V. La
(74) *Attorney, Agent, or Firm*—Fish & Richardson P.C.

(57) ABSTRACT

A computer-implemented method for mapping data between a data tag and a database application using a generic and extensible mapping interface. A computer-implemented method includes: communicating with the data tag via a wireless interface using a data tag query protocol; communicating with a database application via a database interface using a database query protocol; reading a mapping definition; exchanging data between the wireless interface and the database interface by mapping between the data tag query protocol and the database query protocol within the mapping interface using the mapping definition; and storing the mapping definition separately from the mapping interface, providing separation between mapping interface and mapping definition.

55 Claims, 10 Drawing Sheets

```
<Table name="RFID_EQUI">
...
</Table>
```
A table consists of one or more fields:
```
<Table name="RFID_EQUI">
<Field name="EQUNR" type="string" signed="false">
...
</Field>
</Table>
```

FIG. 3

| Tag Block counting | Tag byte counting | Byte counter in XML and LLI calls | Application field name | Write protection field name |
|---|---|---|---|---|
| Block 0 | Byte 0 | 0 | EQUINR | LOCKEQUINR |
| | Byte 1 | 1 | | |
| | Byte 2 | 2 | | |
| | Byte 3 | 3 | | |
| | Byte 4 | 4 | | |
| | Byte 5 | 5 | | |
| | Byte 6 | 6 | | |
| | Byte 7 | 7 | | |
| Block 1 | Byte 0 | 8 | LASTDAMCODE | LOCKCODES |
| | Byte 1 | 9 | | |
| | Byte 2 | 10 | LASTGOODCODE | |
| | Byte 3 | 11 | | |
| | Byte 4 | 12 | DAMCODE | |
| | Byte 5 | 13 | | |
| | Byte 6 | 14 | GOODCODE | |
| | Byte 7 | 15 | | |
| Block 2 | Byte 0 | 16 | NOTE | LOCKNOTE |
| | Byte 1 | 17 | | |
| | Byte 2 | 18 | | |
| | Byte 3 | 19 | | |
| | Byte 4 | 20 | | |
| | Byte 5 | 21 | | |
| | Byte 6 | 22 | | |
| | Byte 7 | 23 | | |
| Block 3 | Byte 0 | 24 | | |
| | Byte 1 | 25 | | |
| | Byte 2 | 26 | | |
| | Byte 3 | 27 | | |
| | Byte 4 | 28 | | |
| | Byte 5 | 29 | | |
| | Byte 6 | 30 | | |
| | Byte 7 | 31 | | |

FIG. 4

```xml
<?xml version="1.0" encoding="utf-8" ?>
<RFIDMapping schemaVersion="1.0">
<Table name="RFID_EQUI">
<Identifier name="ID" type="byte" />
<Protectionarea name="LOCKEQUINR" >
<Field name="EQUNR" type="string" signed="false" >
<RFID startbyte="0" length="8" encoding="UTFstring"/>
</Field>
</Protectionarea>
<Protectionarea name="LOCKCODES" >
<Field name="LASTDAMCODE" type="int" signed="false" >
<RFID startbyte="8" length="2" encoding="int"/>
</Field>
<Field name="LASTGOODCODE" type="int" signed="false" >
<RFID startbyte="10" length="2" encoding="int"/>
</Field>
<Field name="DAMCODE" type="int" signed="false" >
<RFID startbyte="12" length="2" encoding="int"/>
</Field>
<Field name="GOODCODE" type="int" signed="false" >
<RFID startbyte="14" length="2" encoding="int"/>
</Field>
</Protectionarea>
<Protectionarea name="LOCKNOTE" >
<Field name="NOTE" type="string" signed="false" >
<RFID startbyte="16" length="16" encoding="UTFstring"/>
</Field>
</Protectionarea>
</Table>
</RFIDMapping>
```

FIG. 5

```xml
<?xml version="1.0" encoding="utf-8" ?>
<RFIDMapping schemaVersion="1.0">
<Table name="RFID_EQUI">
<Identifier name="ID" type="byte" />
<Protectionarea name="LOCKEQUINR" >
<Field name="EQUNR" type="string" signed="false" >
<RFID startbyte="0" length="8" encoding="UTFstring"/>
</Field>
</Protectionarea>
<Protectionarea name="LOCKCODES" >
<Field name="LASTDAMCODE" type="int" signed="false" >
<RFID startbyte="8" length="2" encoding="int"/>
</Field>
<Field name="LASTGOODCODE" type="int" signed="false" >
<RFID startbyte="10" length="2" encoding="int"/>
</Field>
<Field name="DAMCODE" type="int" signed="false" >
<RFID startbyte="12" length="2" encoding="int"/>
</Field>
<Field name="GOODCODE" type="int" signed="false" >
<RFID startbyte="14" length="2" encoding="int"/>
</Field>
</Protectionarea>
<Protectionarea name="LOCKNOTE" >
<Field name="NOTE" type="string" signed="false" >
<RFID startbyte="16" length="16" encoding="UTFstring"/>
</Field>
</Protectionarea>
</Table>
<Table name="PERSONTAG">
<Identifier name="ID" type="byte" />
<Protectionarea name="LOCKPERSON" >
<Field name="USERNAME" type="string" signed="false" >
<RFID startbyte="0" length="32" encoding="UTFstring"/>
</Field>
</Protectionarea>
<Protectionarea name="LOCKACCESSCODE" >
<Field name="ACCESSCODE" type="int" signed="false" >
<RFID startbyte="32" length="9" encoding="int"/>
</Field>
<Field name="ROOMCODE" type="int" signed="false" >
<RFID startbyte="41" length="7" encoding="int"/>
</Field>
</Protectionarea>
</Table>
</RFIDMapping>
```

FIG. 6

| | | |
|---|---|---|
| supported_sql | ::= | <select_statement> | <update_statement> |
| <select_statement> | ::= | select (<asterisk>| (<fieldname> {<comma> <fieldname>})) <br> from <tablename> <br> [where <filtercondition>| where <condition>] |
| <update_statement> | ::= | update <tablename> <br> set <fieldname> <equals operator> <value> <br> { <comma><fieldname> <equals operator> <value> } <br> where <condition> |
| <fieldname> | ::= | <identifier> |
| <tablename> | ::= | <identifier> |
| <filtercondition> | ::= | filter <equals operator> <character literal> |
| <condition> | ::= | ID <equals operator> <value> |
| <identifier> | ::= | <letter> { <letter> | <digit> | <underscore> } |
| <value> | ::= | <general literal> | <booleanvalue> |
| <booleanvalue> | ::= | true | false |

FIG. 7

- Update rfidequipment
  set equinr='000000006834'
  where ID='3AEF000023F1A05625B3'

- Update rfidequipment
  set equtyp=1, lastinspecdate=2345123053
  where ID='000EF33A00023F1A0625B3'

- Update persontag
  set persnumber='D013422', roommask='A1', accesscode=4209432
  where ID='0000000000001A0625B30683'

FIG. 8

ACCESSING DATA TAG INFORMATION USING DATABASE QUERIES

BACKGROUND

The present invention relates to data processing by digital computer, and more particularly to interfaces for exchanging data.

Various applications, for example, enterprise resource planning (ERP), customer relationship management (CRM), and product lifecycle management (PLM), often store their data in databases. To facilitate the exchange of data between an application and the database, database interfaces that support standardized database query protocols are defined and implemented. One example of a database query protocol is the Structured Query Language (SQL), which is compliant with standards defined by the American National Standards Institute (ANSI) and the International Organization for Standardization (ISO).

An application can usually access the data stored in a database by sending, to a database interface, query messages (i.e., queries) that comply with the database query protocol supported by the interface. In response to receiving a query, the database interface can cause a database management system to initiate a search of the database for data matching criteria specified by the query. After such data is located and retrieved, it is sent via the database interface to the application.

By implementing the database interface, data storage operations and data location are usually transparent to the application. Changes within the database generally do not affect the database interface, and changes within the database structure generally do not affect applications that use the database.

Some applications, for example, product life cycle management and supply chain management applications, include functions for managing real world objects. Managing real world objects can include, for example, their tracking and identification. The real world objects being managed can include a data tag that is physically attached to the object. In general, the data tag is a data carrier that stores wirelessly accessible data. The data tag can be, for example, a smart tag and, more particularly, an RFID tag, which is a smart tag that uses RFID (i.e., radio frequency identification) technology. Data on the data tag can include information relevant to the management of the real word object. The application can exchange data with the data tag by, for example, radio frequency, microwave, infrared, or any other wireless technology. The exchange can be implemented by using any known wireless communication protocol, for example, ISO standard 15961 or ISO standard 15962, Bluetooth, Wireless Local Area Networks (W-LAN), or any other wireless communication protocol. Different data tags can and typically use different wireless technologies and wireless protocols.

SUMMARY

The present invention provides methods and apparatus, including computer program products, that implement techniques for accessing data tag information using database queries.

In general, in one aspect, the invention provides a computer-implemented method for mapping data between a data tag and a database application using a mapping interface. The method includes: communicating with the data tag via a wireless interface using a data tag query protocol; communicating with a database application via a database interface using a database query protocol; reading a mapping definition; exchanging data between the wireless interface and the database interface by mapping between the data tag query protocol and the database query protocol within the mapping interface using the mapping definition; and storing the mapping definition separately from the mapping interface, providing separation between mapping interface and mapping definition.

In general, in another aspect, the invention provides a computer program product, readable by a computer, and embodying a program of instructions capable of mapping data between a data tag, and a database application using a mapping interface. The product including instructions operable to cause the computer to: communicate with the data tag via a wireless interface using a data tag query protocol; communicate with a database application via a database interface using a database query protocol; read a mapping definition; exchange data between the wireless interface and the database interface by mapping between the data tag query protocol and the database query protocol within the mapping interface using the mapping definition; and store the mapping definition separately from the mapping interface, providing separation between mapping interface and mapping definition.

The invention can be implemented to realize one or more of the following advantages. A system in accordance with the invention provides a generic and extensible interface for exchanging data between smart tags and databases. Mapping definitions that map byte-oriented data of data tags to field-oriented data of databases (and vice versa) are not hard coded in the interface. Consequently, the mapping definitions can be changed without requiring the reprogramming of the interface or developing of a new interface. Furthermore, new mapping definitions for new types of tags and databases can be added to current mapping definitions without requiring a reprogramming of the interface or a developing a new interface. The system can support different versions of mapping definitions and, thus, can support more than one version of one type of data tag. The interface can be implemented on a front end or a client computing device, including, for example, a portable computing device (e.g., a portable digital assistant). The interface can support mobile applications, i.e., applications that run on portable computing devices. One implementation of the invention provides all of the above advantages.

Details of one or more implementations of the invention are set forth in the accompanying drawings and in the description below. Further features, aspects, and advantages of the invention will become apparent from the description, the drawings, and the claims.

BRIEF DESCRIPTION OF THE DRAWINGS

FIG. 3 shows an example of an XML file describing one or more tables and fields of each table.

FIG. 4 shows an example of a table with data tag 6 memory layout.

FIG. 5 shows an example of an XML file with a mapping definition for a memory layout.

FIG. 6 shows an example of an XML file with a mapping definition for different tables within a data tag.

FIG. 7 shows Backus-Naur-Form (BNF) of supported SQL statements for a database interface.

FIG. 8 shows examples of messages for a database interface in SQL.

Like reference numbers and designations in the various drawings indicate like elements.

DETAILED DESCRIPTION

Figure 1:
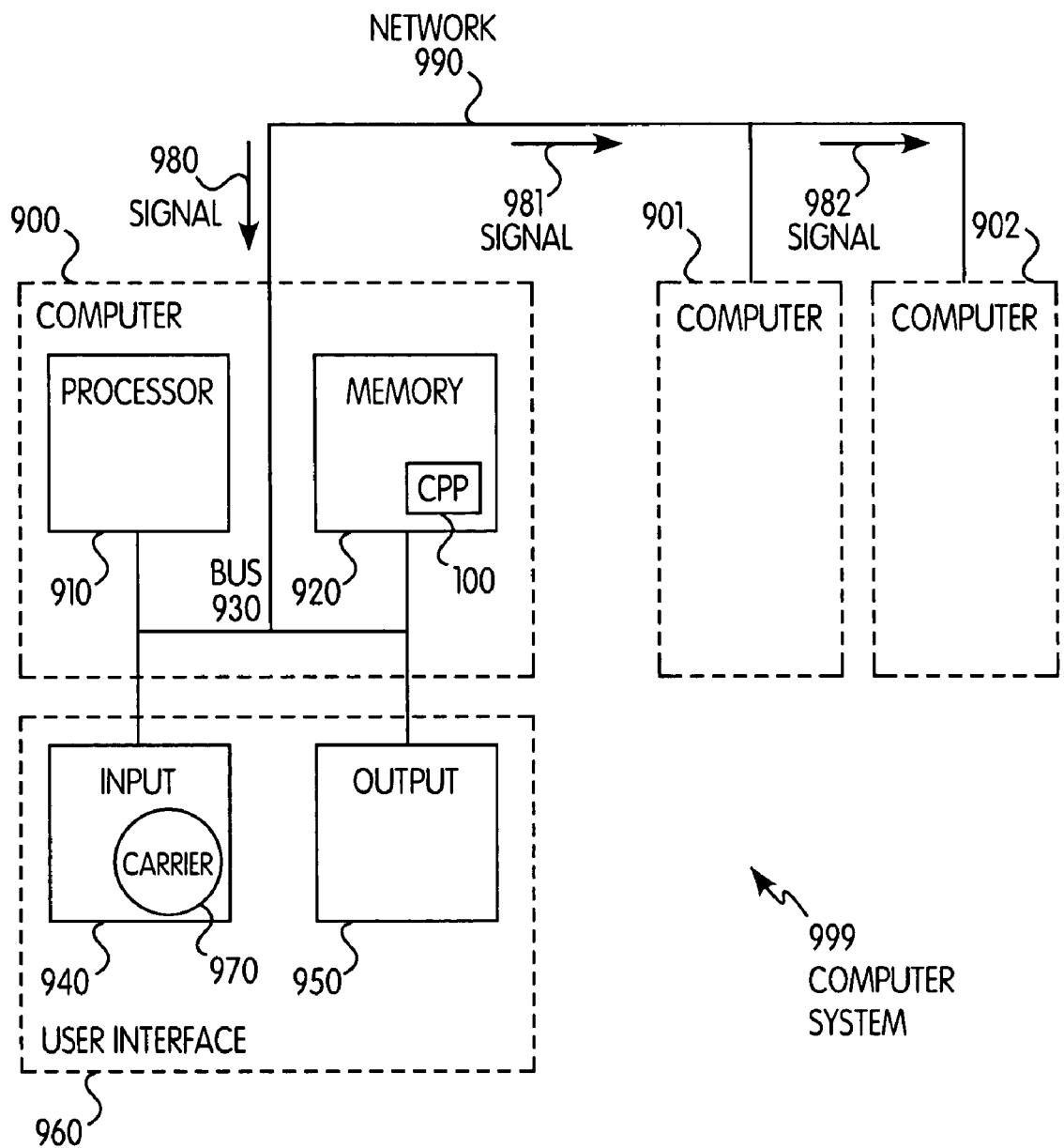
FIG. 1 illustrates an exemplary computer system that can be used to implement one or more embodiments of the present invention.

In FIG. 1, while similar reference numbers (e.g., 100/200, 110/210, etc.) denote similar elements, the function of these elements can be different.

FIG. 1 illustrates a simplified block diagram of exemplary computer system 999 having a plurality of computers 900, 901, 902 (or even more).

Computer 900 can communicate with computers 901 and 902 over network 990. Computer 900 has processor 910, memory 920, bus 930, and, optionally, input device 940 and output device 950 (I/O devices, user interface 960). As illustrated, the invention is implemented by computer program product 100 (CPP), carrier 970 and signal 980.

With respect to computer 900, computer 901/902 is sometimes referred to as a "remote computer." Computer 901/902 is, for example, a server, a peer device or other common network node, and typically has many or all of the elements described relative to computer 900.

Computer 900 is, for example, a conventional personal computer (PC), a desktop device or a hand-held device, a multiprocessor computer, a pen computer, a microprocessor-based or programmable consumer electronics device, a minicomputer, a mainframe computer, a personal mobile computing device, a mobile phone, a portable or stationary personal computer, a palmtop computer or the like.

Processor 910 is, for example, a central processing unit (CPU), a micro-controller unit (MCU), a digital signal processor (DSP), or the like.

Memory 920 comprises elements that temporarily or permanently store data and instructions. Although memory 920 is illustrated as part of computer 900, memory can also be implemented in network 990, in computers 901/902 in processor 910 itself (e.g., cache, register), or elsewhere. Memory 920 can be read-only memory (ROM), random access memory (RAM), or memory with other access options. Memory 920 is physically implemented by computer-readable media, for example: (a) magnetic media, like a hard disk, a floppy disk, or other magnetic disk, a tape, a cassette tape; (b) optical media, like optical disk (CD-ROM, digital versatile disk—DVD); (c) semiconductor media, like DRAM, SRAM, EPROM, EEPROM, or a memory stick.

Optionally, memory 920 may be distributed. Portions of memory 920 can be removable or non-removable. For reading from media and for writing in media, computer 900 uses well-known devices, for example, disk drives or tape drives.

Memory 920 may store modules such as, for example, a basic input output system (BIOS), an operating system (OS), a program library, a compiler, an interpreter, and a text-processing tool. Modules are commercially available and can be installed on computer 900. For simplicity, these modules are not illustrated.

CPP 100 has program instructions and, optionally, data that cause processor 910 to execute method steps of the present invention. In other words, CPP 100 can control the operation of computer 900 and its interaction in network system 999 so that it operates to perform in accordance with the invention. For example and without the intention to be limiting, CPP 100 can be available as source code in any programming language, and as object code ("binary code") in a compiled form.

Although CPP 100 is illustrated as being stored in memory 920, CPP 100 can be located elsewhere. CPP 100 can also be embodied in carrier 970.

Carrier 970 is illustrated outside computer 900. For communicating CPP 100 to computer 900, carrier 970 is conveniently inserted into input device 940. Carrier 970 is implemented as any computer readable medium, such as a medium largely explained above (cf. memory 920). Generally, carrier 970 is an article of manufacture having a computer readable medium with computer readable program code to cause the computer to perform methods of the present invention. Further, signal 980 can also embody computer program product 100.

Having described CPP 100, carrier 970, and signal 980 in connection with computer 900 is convenient. Optionally, further carriers and further signals comprise computer program products (CPP) to be executed by further processors in computers 901 and 902.

Input device 940 provides data and instructions for processing by computer 900. Device 940 may be, for instance, a keyboard, a pointing device (e.g., mouse, trackball, cursor direction keys), a microphone, a joystick, a game pad, a scanner, a disc drive, or any other input device. Although the examples are devices with human interaction, device 940 can also be a device without human interaction, such as, for example, a wireless receiver (e.g., with satellite dish or terrestrial antenna), a sensor (e.g., a thermometer), or a counter (e.g., a goods counter in a factory). Input device 940 can serve to read carrier 970.

Output device 950 presents instructions and data that have been processed. For example, this can be a monitor or a display, cathode ray tube (CRT), flat panel display, liquid crystal display (LCD), speaker, printer, plotter, or vibration alert device. Output device 950 can communicate with the user, but it can also communicate with further computers.

Input device 940 and output device 950 can be combined into a single device. Any device 940 and 950 can be provided optionally.

Bus 930 and network 990 provide logical and physical connections by conveying instruction and data signals. While connections inside computer 900 are conveniently referred to as "bus 930", connections between computers 900-902 are referred to as "network 990". Optionally, network 990 includes gateways, which are computers that specialize in data transmission and protocol conversion. Optionally, network 990 can include one or more components for conveying data through wireless (e.g., RF and infrared) technologies.

Devices 940 and 950 are coupled to computer 900 by bus 930 (as illustrated) or by network 990 (optionally). While the signals inside computer 900 are mostly electrical signals, the signals in network 990 are electrical, electromagnetic, optical or wireless (radio) signals.

Networks are commonplace in offices, enterprise-wide computer networks, intranets and the Internet (e.g., world wide web WWW). Network 990 can be a wired or a wireless network. To name a few network implementations, network 990 can be, for example, a local area network (LAN); a wide area network (WAN); a public switched telephone network (PSTN); an Integrated Services Digital Network (ISDN); an infrared (IR) link; a radio link such as Universal Mobile Telecommunications System (UMTS), Global System for Mobile Communication (GSM), Code Division Multiple Access (CDMA); or a satellite link.

A variety of transmission protocols, data formats and conventions is known, for example, as transmission control protocol/internet protocol (TCP/IP), hypertext transfer protocol (HTTP), secure HTTP, wireless application protocol (WAP), unique resource locator (URL), a unique resource identifier (URI), hypertext markup language (HTML), extensible markup language (XML), extensible hypertext markup language (XHTML), wireless markup language (WML), and Standard Generalized Markup Language (SGML).

Interfaces coupled between the elements are also well known in the art. For simplicity, interfaces are not illustrated. An interface can be, for example, a serial port interface, a parallel port interface, a game port, a universal serial bus (USB) interface, an internal or external modem, a video adapter, or a sound card.

Computer and program are closely related. As used hereinafter, phrases, such as "the computer provides" and "the program provides" are convenient abbreviation to express actions by a computer that are controlled by a program.

Figure 2A:
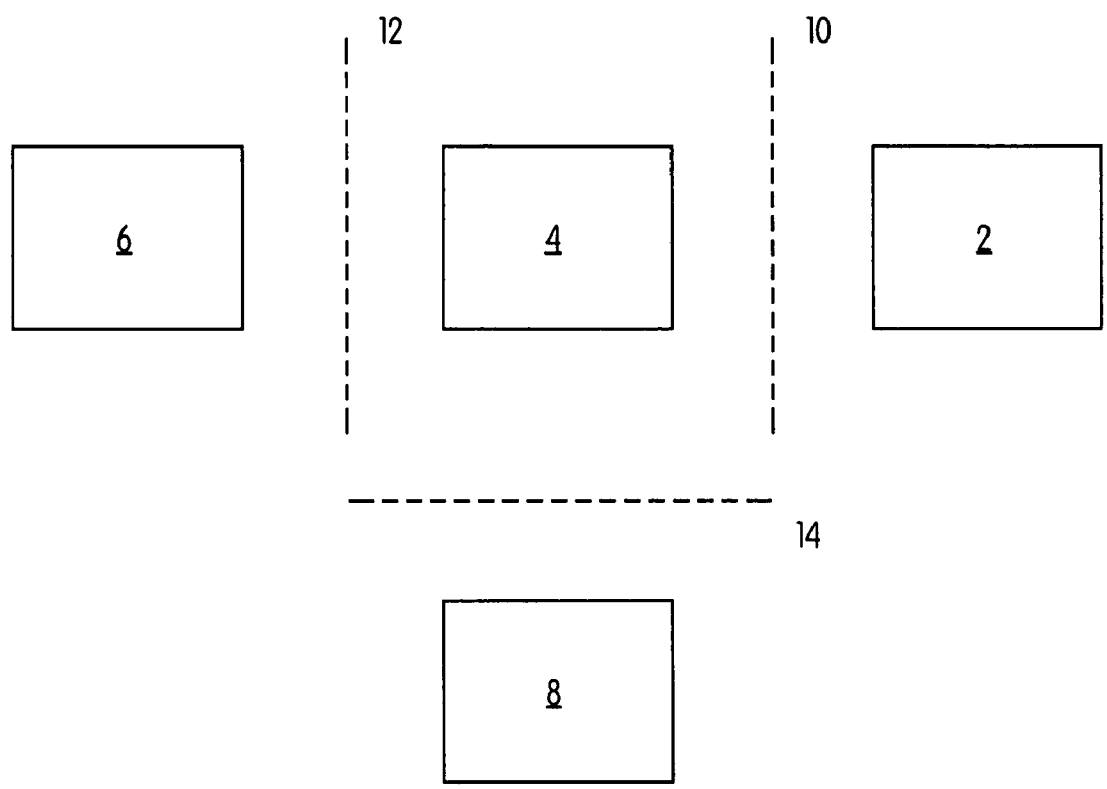
FIG. 2A shows a system in accordance with the invention.

FIG. 2A shows a system in accordance with the invention. Shown are an application 2, a mapping interface 4, a data tag 6, and a mapping definition 8. A database interface 10 is provided between database application 2 and mapping interface 4. A wireless interface 12 is provided between mapping interface 4 and data tag 6. Further, a communication channel 14 is provided between mapping interface 4 and mapping definition 8.

The application 2 supports field-oriented data. That is, the application 2 can access data stored in a database by using database query protocol messages. The application can be, for example, one of the above described applications that uses a database. The application 2 can be stored on and executed by a front end computing device, which can be a mobile device, as will be further described below. There can be more than one application. The application can be a mobile application. In one implementation, the application is Mobile Asset Management, available from SAP AG, of Walldorf, Germany.

The data tag 6 can be a smart tag, an RFID tag, or any other types of data carrier that stores wirelessly accessible data. The data tag 6 can be placed on a real world object and can carry data about these objects. These objects may, for instance, be labels for products, identification cards, access cards, transportation tickets, event tickets, vehicles, machines, materials or any other real world objects, for which data needs to be processed within an application. The system can support multiple tags and, furthermore, different types of tags.

Communication with the data tag may be carried out wirelessly via a wireless interface, using any wireless communication protocol, such as ISO 15961, ISO 15962, IRDA, Bluetooth, W-LAN, or any other wireless communication protocol. Messages on the wireless interface may follow a data tag query protocol. The data tag query protocol may be any protocol, which is supported by the respective data tag. The data within the data tag may be accessed using the data tag query protocol messages. These messages may adhere to ISO 15961, or ISO 15962, or any other protocol available for accessing wireless data tags.

The database interface 10 allows communicating using a database queries, for example SQL. Wireless interface 12 allows communicating using data tag access queries, for example, according to ISO 15961 or ISO 15962. Communication between mapping interface 4 and mapping definition 8 is possible using any communication protocol, for example, TCP/IP, FTP, and file streams.

The mapping interface 4 is generally a generic interface for exchanging the byte-oriented data of the data tag 4 and the field-oriented data of the application 2. To facilitate such an exchange, the mapping interface 4 can access one or more mapping definitions, for example, mapping definition 8. The mapping definitions are not hard coded in the interface. The mapping definitions are represented by data that can be stored in a file, for example, an XML file. Mapping definitions are further described below.

The mapping interface can provide access for the application 2. The application 2, which can be, for example, one that runs on DB2, can query the data tag through the interface. The database interface may be accessed by database applications, such as any business applications, which need access to data, using database query protocol messages. The database query protocol messages may be implemented in any database query protocol, such as, for example, structured query language (SQL) protocol, or any other database query protocol.

The mapping definition 8 provides a mapping between the database queries and the wireless interface queries. The mapping definition defines how to map messages between the data tag query protocol and the database query protocol. By mapping these messages, data can be exchanged between the wireless interface 12 and the database interface 10. Mapping allows the system to use database query protocol messages sent to the database interface to access the data within the data tags.

The database query protocol messages are mapped to data tag query protocol messages and sent in the correct format to the data tag via the wireless interface 12. The data tag 6 can respond to such a message with the respective data. This data may be in the data tag query protocol format. Data from the data tag is received via the wireless interface and can be mapped onto the database query protocol. The system can send the data via the database interface as a database query protocol message to the requesting application (i.e., application 2).

To allow accounting for different kinds of data tags and different kinds of data tag protocols, and to separate the mapping definition from the mapping interface, the mapping definitions are not hard coded in the source code that implements the mapping interface and, thus, can be stored separately from the mapping interface. In case different data tags are used, the mapping definitions for the different data tags can be updated without changing the mapping interface, which can reduce implementation costs. When changing a supported data query protocol, only the mapping definition need be modified. The mapping interface can remain unchanged.

The mapping definition is easily accessible, as it can be stored separately from the mapping interface. The source code of the mapping interface need not be modified when changing the mapping definition. Therefore, implementation time and costs may be reduced when implementing a new or changed data tag query protocol. Furthermore, the mapping definitions can be stored on the same device where the mapping interface is stored.

In one implementation, the appropriate mapping definition is stored on the data tag. In this implementation, the system has the capability to generate dynamically mapping definitions in accordance to the interrogated data tag, which includes all the information needed to map the data from the data tag to database query messages and vice versa. It is then only necessary to read the mapping definition from the data tag according to a common standard. In such a case, the mapping interface needs only to read the mapping definition from the data tag.

Mapping definitions can be stored in a separate memory area of the data tag. This area can, for instance, be write-protected. Access to the particular memory area can be granted to any requesting program whereas access to different data on the data tag may be read/write-protected.

As mentioned above, the mapping definitions can be stored in one or more files. Developers can access the file to change the mapping definition in case such a change is required. This might be necessary after the data tag query protocol or the database query protocol has changed. Different files for accessing different types of data tags can be provided. The mapping interface can, in such a case, access the appropriate file for mapping data from a particular data tag to the database interface.

The system can store various mapping definitions representing different types of data tags within the file. One file can include different mapping definitions for different kinds of data tags. When accessing the file via the mapping interface, the type of data tag, which may already be identified via the wireless interface, can determine which part of the file including the respective mapping definition is read.

The memory size within the data tags may be limited. For example, upon identifying the size of the data, which is stored within the data tag together with different kinds of data, management of memory within the data tag using the mapping definition may be useful. By managing the memory, the types of data, which needs to be stored on the data tag, may be accounted for. For instance, in case a first piece data has the size of 8 bits and a second piece of data has the size of 3 bits, this may be accounted for in the memory management. Clustering of data on the data tag, for instance, providing blocks of 8 bits each, may be avoided. Instead of using 16 bits for storing the above-mentioned data, only 8 bits are required. Memory management may therefore reduce the amount of memory needed for storing the required data.

The system can include mapping definitions for un-clustered memory areas for data within the data tag. This feature can reduce the memory required for storing data on the data tag.

It might be necessary to change the way data is stored on a data tag. In such a case, the system can update the mapping definition, and store data within the data tag from a previous format into a new format, according to the updated mapping definition. This feature can, for example, be useful in case the application using the data on the data tag changes. In that event, the data on the data tag might need to be stored or read in a different format. The system can read data from the data tag with an old format and to write the data back to the data tag in a new format.

In case the requirements of memory may change dynamically, the system can adapt memory usage of the data tag using the mapping definition dynamically. In particular, when the data to be stored on the data tag changes in size, dynamic adaptation of memory usage might be useful.

To allow accessing the mapping device independently, the mapping definitions can be stored in a file in a device-independent format. A device-independent format can, for instance, be a markup language, for example, XML or any other markup language. Other device-independent, formally defined languages to describe data can also be implemented. Access to such a data is device-independent and can be accounted for within any device, for example, a mobile device running the mapping interface as well as the application program.

A description of accessible data within the data tag can be stored on the data tag itself and, furthermore, be made available to an application via the database interface. The application can request such a description of accessible data from the mapping interface by sending a describe-table request to the database interface. The mapping interface can retrieve the description from the mapping definition and provide the requesting application with a describe-table response via the database interface. The application can therefore be informed about accessible data, for example, the accessible field names of available data. Upon identifying the field names, the application can request the respective data using the field names by, for example, sending appropriate requests in a database query protocol message to the database interface.

The system can receive a database query protocol request from an application to determine a description of accessible data via the database interface, obtain the description of accessible data from the mapping definition, and provide the description of accessible data to the requesting application via the database interface.

The system can receive a database query protocol request from an application to determine data from a data tag, map the database query protocol request onto a data tag query protocol request, and provide the data tag query protocol request to the wireless interface to interrogate the data tag. The data tag may be interrogated to respond to the respective request.

The system can receive data from a data tag as a data tag query protocol message via the wireless interface, map the data from the data tag query protocol message into a database query protocol message, and provide the data as a data query protocol message to the database interface. A response of the data tag upon a data tag query protocol request can be mapped onto a database query protocol message and provided to the requesting application.

To allow processing data of the data tags in the same manner as data from a database, the system can provide the data of a data tag to the database interface formatted as database data. In one implementation, the data of one complete tag can be mapped onto one row of a virtual database table. In case several tags with the same format are read simultaneously, the data of each tag is stored in separate rows. A column within the row represents exactly one field in the virtual database table. A column or field maps to one continuous byte area on the tag.

The data on the data tag can be stored in a byte-oriented format. A certain number of bits can be combined into one byte block. The byte block can account for particular data within the data tag. This byte block can carry certain data, which can be addressed using an application field name. As data within the data tag may be stored byte-oriented and bytes defining the particular data may be combined into blocks, the data blocks may be accessed using the field names by mapping the field names into the respective byte position.

For accessing data via the wireless interface without regard for the implementation of the wireless interface in the mapping interface, a physical layer access interface for accessing the data tag via the wireless interface may be provided according to embodiments. A physical layer access interface may provide access to the wireless interface using standardized messages. The method for transporting these messages using the wireless interface may be accounted for within the physical layer access interface. To that end, the mapping interface may be device-independent as well as independent of the protocol used on the wireless interface.

Different data tags may provide data in different formats. Certain embodiments provide standardizing messages received from the data tag via the wireless interface into a device-independent format within the physical layer access interface. By standardizing messages into a device-independent format, the mapping interface need not identify which type of wireless interface or data tag is used. The device, which runs the mapping interface and the physical layer access interface, may provide access to the wireless interface using different modes of communication. Communication between the wireless interface and the physical layer access interface may be device-dependent. To account for this device-dependency, the physical layer access interface may standardize the messages received from the data tag via the wireless interface.

The system can format messages received from the mapping interface into a device-specific format within the physical layer access interface. Using standard messages may be allowed within the mapping interface without accounting for different devices for wireless interfaces.

To provide communication between the data tag and the mapping interface, the system can facilitate the exchange of data between the data tag and the mapping interface via the wireless interface and the physical access interface, and vice versa. Therefore, messages can be directed to and from the data tag via the wireless interface and the physical access interface.

To provide information about available data tags within a scan area of the wireless interface, e.g., the area where the radio waves allow interrogating the data tags, embodiments provide continuous scanning for available data tags. By continuously scanning the area, all available data tags can be interrogated.

By providing data of a data tag via the database interface to an application, once a data tag is accessible, as provided by certain implementations, event-driven access to the data may be possible. The application can receive the information about available data and then request the data via the database interface. If data is available, the requests need to be sent to the database interface.

Upon receipt of a request from an application via the database interface, the system can provide user-or application-driven access by scanning for available data tags. The application can cause the mapping interface to interrogate for data tags.

To provide controlled access to the data within the data tags, certain embodiments provide write-protecting memory blocks within the data tag, to the extent that, by using database query protocol messages, memory areas within the data tag can be write-protected. Therefore, areas within the data tag may be write-protected using messages sent to the data tag via the database interface. The application itself can cause write-protection.

To provide a mapping definition for various applications, for example, with a mobile device, certain embodiments implement the mapping definition in a device-independent format. The device independent format may be any markup language, such as XML.

The system can provide error handling and event handling within the mapping interface. Errors may be accounted for during mapping and receiving data tag query messages and database query messages. Events handling can be provided in response to the occurrence of certain activities.

The mapping interface and/or mapping definitions can be implemented within a mobile device. The mobile device may be a mobile phone, a personal digital assistant (PDA), a mobile terminal, or any other mobile device, asset management using radio frequency tags may be possible using mobile devices.

The system can include an interrogation device for wirelessly accessing data stored on data tags. the interrogation device can be any device that allows communicating according to an appropriate communication protocol.

Figure 2B:
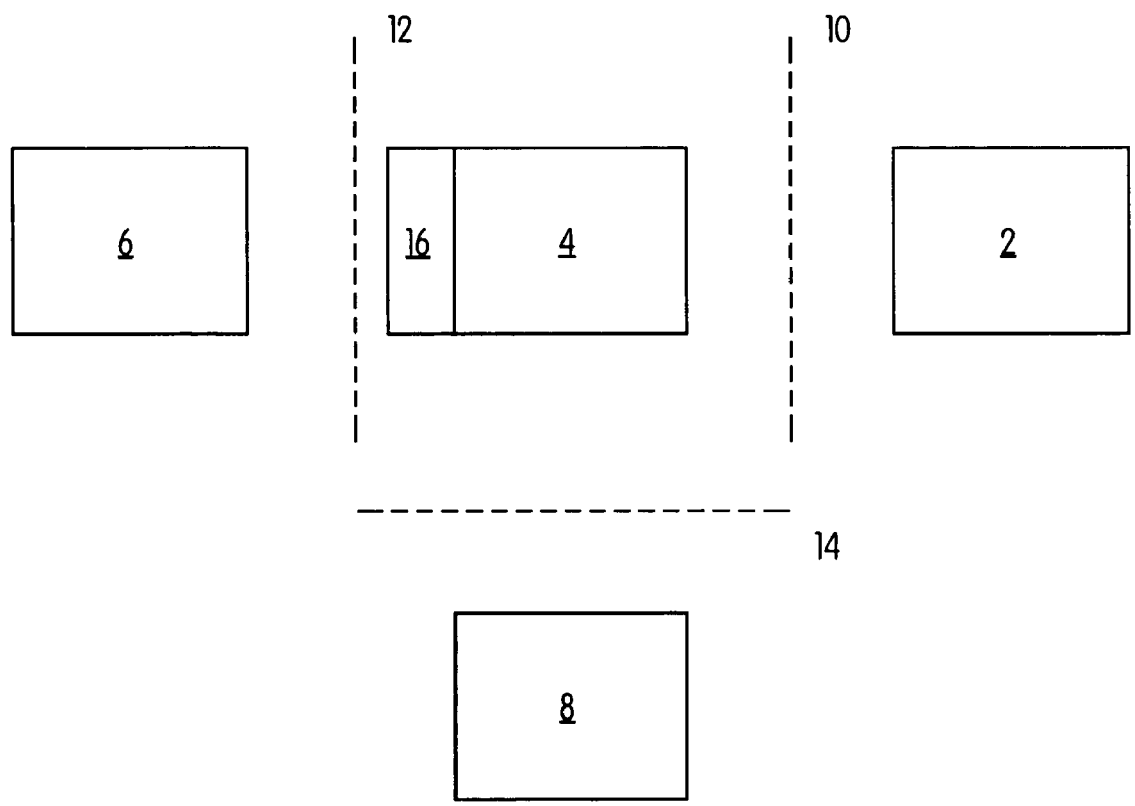
FIG. 2B shows the system with a low-level interface.

FIG. 2B depicts the system of FIG. 2A with an additional low-level interface. Low-level interface 16 is a physical layer access interface. The low-level interface, located between the data tag 6 and the mapping interface 4 allows standardizing the data from data tag 6 into a device-independent format. In one embodiment, mapping interface 4 may use Java database connectivity API. Mapping interface 4 may provide JDBC commands, calling the low-level interface 16 with the appropriate parameters, thus providing communication via wireless interface 12.

The mapping definition 8 can provide mapping information for mapping of certain data blocks within data tag 6 onto application fields, which can be read by data application 2. One example implementation of mapping definition 8 is depicted in FIG. 4.

FIG. 3 is an XML file describing one or more tables and fields of each table. For each field the mapping to the physical bytes on the data tag 6 is given. For each field the mapping to the physical bytes of data tag 6 may be shown for example by <RFID startbyte="2" lengths="15" encoding="string"/>.

In the XML file, there is always one constant entry for each table. This constant entry may describe the unique tag identification, provided by the chip manufacturer. Such an ID may be

```
<Identifier name="ID" type="string">
</Identifier>
```

These fields may automatically be mapped from the data tag 6 to the database 4 with the mapping definition 8.

FIG. 4 depicts a table with an exemplary data tag 6 memory layout as well as application field names and write-protection field names. As shown, bytes within the data tag 6 may be combined into blocks. Block 0 comprises, for example, bytes 0-7. Block 1 may comprise bytes 8-15, block 2 may comprise bytes 16-23, and block 3 may comprise bytes 24-31. For each block, the bytes may be counted from 0-7. The mapping definition 8 allows, for instance, mapping the consecutive byte numbers onto the respective application field name. For instance, bytes 0-7 may be mapped by mapping definition 8 onto application field name "EQUINR". Bytes 8-9 may be mapped onto application field name "LASTDAMCODE". Further mapping of bytes to application field names may be seen in FIG. 4.

According to embodiments, write-protection may also be used within database carrier 6. According to certain embodiments, the data may be organized according to requirements of the application. Therefore, memory organization may be done by mapping definition 8.

To support write-protection via the JDBC interface, a database field mapping may be provided, to access certain bytes. It may be possible to cluster several database fields to write-protection fields, realizing the memory block boundaries. In an XML configuration file, all field names may be enclosed by </Protection area> tags. If the start tags contain a name, the fields inside the <protection area> tag may be write-protected.

For instance the tag <protection area name="LOCKEQUINR"> may be write-protected by the command update <table_name> set LOCKEQUINR=true.

In case the write-protection in an update command is used, all fields mentioned in that particular command may be updated and write-protected independently of the order of the field names.

FIG. 5 depicts an exemplary XML file with a mapping definition for a memory layout according to FIG. 4.

In FIG. 6, a mapping definition for different tables within a data tag 6 is shown. As can be seen, two different tags <table_name ="string">, for example "RFID_EQUI" and "PERSONTAG" are the table names which are supported by the mapping definition 8 as depicted in FIG. 6.

It may also be possible to support changes in the memory of a data tag 6 during its lifetime. Different data tag 6 types with different storage capacity may also be supported. The different formats may be realized within several SQL table statements, as depicted in FIG. 7.

FIG. 7 depicts a Backus-Naur-Form (BNF) of supported SQL statements for database interface 10. Examples of messages for database interface 10 are for instance select <field_names> from <table_names> where filter=tag type This method may allow reading all necessary bytes from all available tags. It may also allow mapping the bytes to the defined mapping and giving the initiating application of this method the result list with the corresponding fields.

If more than one data tag 6 is available, all data tag 6 data may be given to the caller via several rows of a virtual table using database interface 10. A calling application may then decide which table name to use. All information may be mapped according to mapping definition 8.

The tag <field names> may require at least one field name. More field names may also be allowed. A <where> clause with a special term "filter" may also be allowed. The value of the filter may directly be mapped to the low-level interface 16.

Another exemplary method supported may be update <table_name> said <field_name>="value" where ID="XYZ"

This command may provide updating one or more fields within a data tag 6 named "XYZ". It may always be necessary to fully qualify the complete field names and give a "where" clause with complete keys. Examples of such commands are depicted in FIG. 8.

Figure 9:
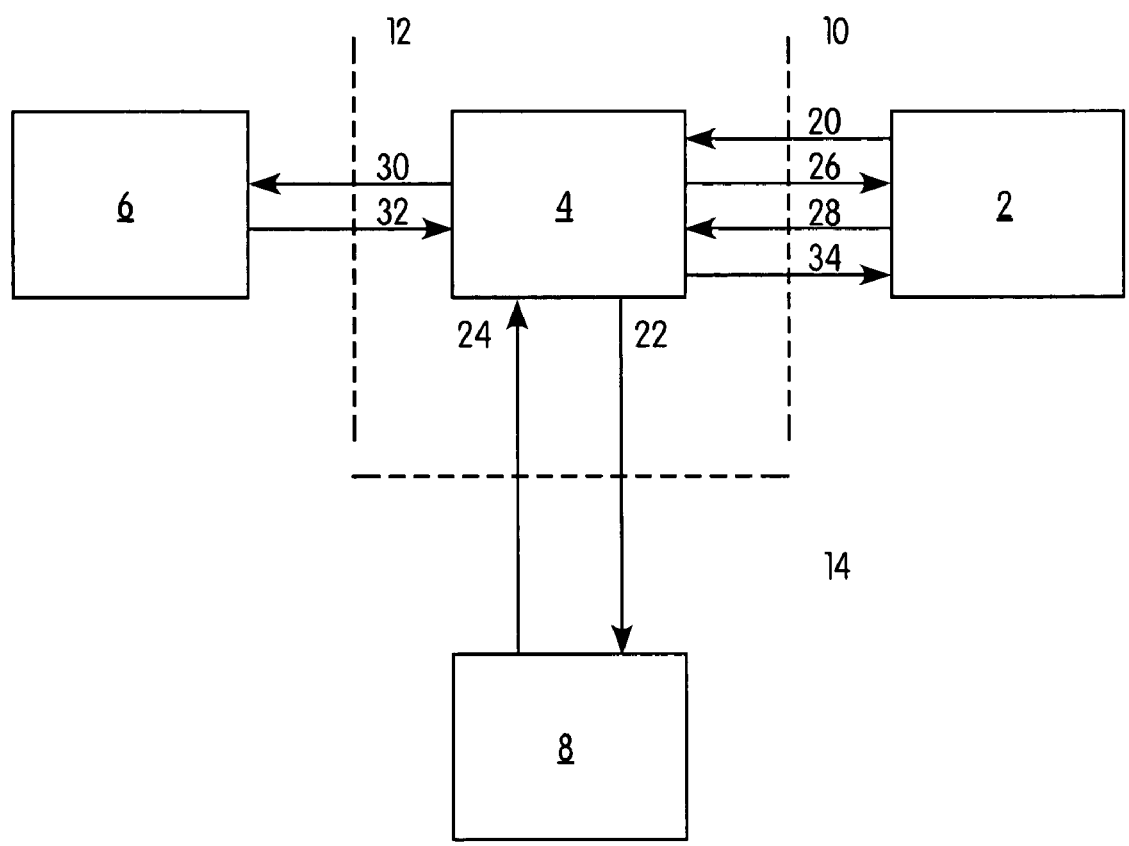
FIG. 9 shows a method for accessing data stored on a data tag.

FIG. 9 shows a method for accessing data on a data tag 6 according to embodiments. Database application 2 requests a description of tables to database interface 10 with a respective request message 20. Mapping interface 4 receives the request and sends request 22 to mapping definition 8 to respond with the respective table names. Mapping definition 8 responds with a message 24 comprising the available table names. The description of the table names and field names comprised in this message may be stored in mapping interface 4 for further processing.

Additionally, mapping interface 4 may send a message 26 via database interface 10 to database application 2 comprising the table definitions and field names for the respective tables. The database application 2 then knows which tables are available and which are the field names.

For accessing data, database application 2 may request data of a particular field of a particular table using a database query 28. Mapping interface 4 sends the request 30 to data tag 6 via wireless interface 12 requesting the respective data. Data tag 6 responds with a message 32 via wireless interface 12 comprising the available data. Mapping interface 4 maps the data from the data tag 6 onto a message 34 according to the database query protocol and sends this message via database interface 10 to database application 2.

Figure 10:
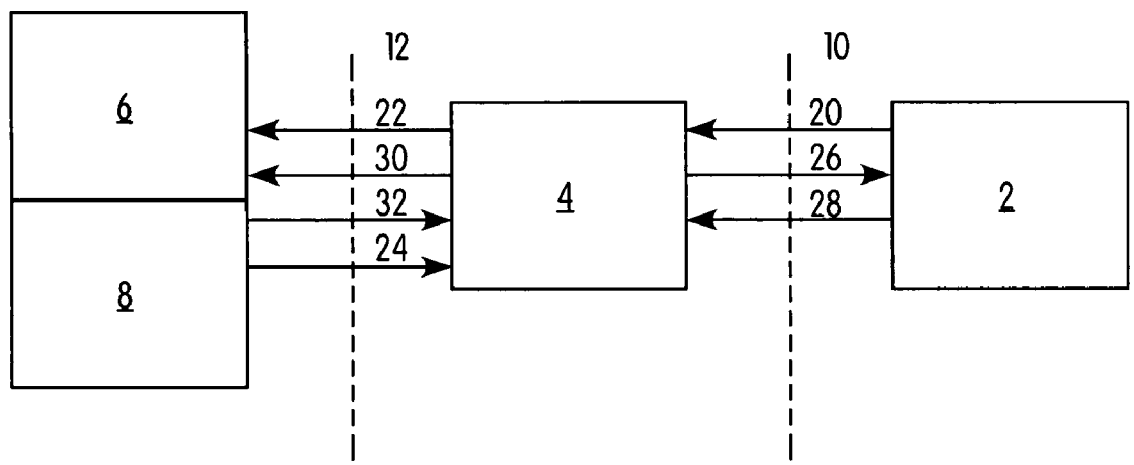
FIG. 10 shows another method for accessing data stored on a data tag.

FIG. 10 shows a method similar to the one shown by FIGS. 9A and 9B. However, according to FIGS. 10A and 10B, the mapping definition 8 may be stored within data tag 6. Therefore, messages 22, 24 may be transmitted via wireless interface 12, rather than via interface 14.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described herein, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD- ROM disks. The processor and the memory can be supplemented by, or incorporated in special purpose logic circuitry.

The invention can be implemented in a computing system that includes a back-end component (e.g., a data server), a middleware component (e.g., an application server), or a front-end component (e.g., a client computer having a graphical user interface or a Web browser through which a user can interact with an implementation of the invention), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments, but other embodiments can be implemented and are within the scope of the following claims. For example, the operations of the invention can be performed in a different order and still achieve desirable results. As one example, the process depicted in FIGS. 9 and 10 may not require the particular order shown, or sequential order, to achieve desirable results. In certain implementations, multitasking and parallel processing may be preferable. Other embodiments are within the scope of the following claims.

REFERENCE NUMBERS 2 database application
4 mapping interface
6 data tag
8 mapping definition
10 database interface
12 wireless interface
14 communication channel
16 low-level interface
20 request describe table
22 read available tables
24 send available tables
26 respond describe table
28 request data
30 read data
32 send data
34 respond data
100 computer program product
900 computer
910 processor
920 memory
930 bus
940 input device
950 output device
960 user interface
970 program carrier
980 program signal
990 computer network
999 computer network system

What is claimed is:

1. A computer-implemented method for mapping data between a data tag and a database application using a mapping interface, comprising:

communicating with the data tag via a wireless interface using a data tag query protocol;
communicating with the database application via a database interface using a database query protocol;
reading a mapping definition;
exchanging data between the wireless interface and the database interface by mapping between the data tag query protocol and the database query protocol using the mapping definition, the mapping being performed in the mapping interface; and
storing the mapping definition separately from the mapping interface.

2. The computer-implemented method of claim 1, wherein the mapping definition is stored within the data tag.

3. The computer-implemented method of claim 2, wherein the mapping definition is stored in a separate memory area of the data tag.

4. The computer-implemented method of claim 1, wherein the mapping definition is stored in a file.

5. The computer-implemented method of claim 4, further comprising:

storing various mapping definitions representing different types of data tags within the file.

6. The computer-implemented method of claim 1, further comprising:

managing memory within the data tag using the mapping definition.

7. The computer-implemented method of claim 1, further comprising:

defining un-clustered memory areas for data within the data tag.

8. The computer-implemented method of claim 1, further comprising:

updating the mapping definition; and
storing data within the data tag from a previous format into a new format according to the updated mapping definition.

9. The computer-implemented method of claim 1, further comprising:

dynamically adapting memory usage of the data tag using the mapping definition.

10. The computer-implemented method of claim 1, wherein the mapping definition is stored in a file in a device-independent format.

11. The computer-implemented method of claim 1, further comprising:

providing a description of accessible data within the data tag to an application via the database interface.

12. The computer-implemented method of claim 1, further comprising:

receiving, via the database interface, a database query protocol request from a requesting application to determine a description of accessible data via the database interface;
obtaining the description of accessible data from the mapping definition; and
providing the description of accessible data to the requesting application via the database interface.

13. The computer-implemented method of claim 1, further comprising:

receiving a database query protocol request from an application to determine data from a data tag;
mapping the database query protocol request onto a data tag query protocol request; and
providing the data tag query protocol request to the wireless interface to interrogate the data tag.

14. The computer-implemented method of claim 1, further comprising:
receiving data from a data tag as a data tag query protocol message via the wireless interface;
mapping the data from the data tag query protocol message into a database query protocol message; and
providing the data as a database query protocol message to the database interface.

15. The computer-implemented method of claim 1, further comprising:
providing data from the data tag to the database interface formatted as database data.

16. The computer-implemented method of claim 15, wherein the data from the data tag is provided to the database interface as one row of a database.

17. The computer-implemented method of claim 15, wherein a defined byte area of the data tag is provided to the database interface as one column of a row.

18. The computer-implemented method of claim 1, wherein byte-oriented data is stored on the data tag.

19. The computer-implemented method of claim 1, further comprising:
providing field-oriented data to the database interface.

20. The computer-implemented method of claim 1, wherein a physical layer access interface is used for communicating with the data tag via the wireless interface.

21. The computer-implemented method of claim 20, further comprising:
normalizing messages received from the data tag via the wireless interface into a device-independent format within the physical layer access interface.

22. The computer-implemented method of claim 20, further comprising:
formatting messages received from the mapping interface into a device-specific format within the physical layer access interface.

23. The computer-implemented method of claim 20, further comprising:
communicating data between the data tag and the mapping interface via the wireless interface and the physical access interface.

24. The computer-implemented method of claim 1, further comprising:
continuously scanning for available data tags.

25. The computer-implemented method of claim 1, further comprising:
providing data from a data tag via the database interface to the database application after the data tag is accessible.

26. The computer-implemented method of claim 1, further comprising:
scanning for available data tags after receiving a request from the database application via the database interface.

27. The computer-implemented method of claim 1, further comprising:
write-protecting memory blocks within the data tag, by using database query protocol messages.

28. The computer-implemented method of claim 1, wherein the mapping definition is implemented in a device-independent format.

29. The computer-implemented method of claim 1, wherein mapping between the data tag query protocol and the database query protocol within the mapping interface is implemented in a device-independent format.

30. The computer-implemented method of claim 1, further comprising:
writing data, which is received via the database interface, to the data tag.

31. The computer-implemented method of claim 1, further comprising:
performing byte converting when mapping the data between the data tag query protocol and the database query protocol.

32. The computer-implemented method of claim 1, further comprising:
performing error handling within the mapping interface.

33. The computer-implemented method of claim 1, further comprising:
performing event handling within the mapping interface.

34. A system for mapping data between a data tag and a database application, comprising:
a mapping device comprising:
a mapping interface for reading a mapping definition;
a wireless interface for communicating with the data tag using a data tag query protocol; and
a database interface for communicating with the database application using a database query protocol;
wherein the mapping device is configured to implement communication between the wireless interface and the database interface by mapping between the data tag cuery protocol and the database ciuerv protocol using the mapping definition; and
a storage device that is separate from the mapping device, the storage device for storing the mapping definition separately from the mapping interface.

35. The system of claim 34, wherein the data tag comprises a radio frequency identification tag, a smart tag, or an infrared tag.

36. The system of claim 34, wherein the mapping device comprises a mobile device.

37. The system of claim 34, wherein the storage device is located within the data tag.

38. The system of claim 34, wherein the storage device comprises a memory area for storing the mapping definition.

39. The system of claim 34, wherein the storage device comprises a file system.

40. The system of claim 34, further comprising:
memory management means within the storage device or the mapping device for managing memory within the data tag using the mapping definition.

41. The system of claim 34, wherein the mapping device comprises description providing means to provide a description of accessible data within the data tag to an application via the database interface.

42. The system of claim 34, wherein the mapping device comprises formatting means to provide, to the database interface, data from the data tag that is formatted as database data.

43. The system of claim 42, wherein the formatting means is configured to provide, to the database interface, data from the data tag as one row of a database.

44. The system of claim 42, wherein the formatting means is configured to provide, to the database interface, a defined byte area of the data tag as one column of a row.

45. The system of claim 34, wherein the storage device is configured to store byte-oriented data on the data tag.

46. The system of claim 34, wherein the mapping device comprises a physical layer access interface for accessing the data tag via the wireless interface.

47. The system of claim 46, wherein the physical layer access interface is configured to standardize messages received from the data tag via the wireless interface into a device-independent format.

48. The system of claim 46, wherein the physical layer access interface is configured to format messages received from the mapping interface into a device-specific format.

49. The system of claim 46, wherein the physical layer access interface is configured to communicate data between the data tag and the mapping interface via the wireless interface.

50. The system of claim 34, wherein the data tag comprises write-protect memory blocks that are write-protectable using database query protocol messages.

51. The system of claim 34, wherein the mapping device comprises byte converting means confiaured to perform byte conversion as part of mapping data between the data tag query protocol and the database query protocol.

52. The system of claim 34, wherein the mapping device comprises error handling means to perform error handling.

53. The system of claim 34, wherein the mapping device comprises event handling means to perform event handling.

54. The system of claim 34, wherein the mapping device comprises interrogation means for wirelessly accessing the data tag using the wireless interface.

55. A computer program product readable by a computer and embodying a program of instructions capable of mapping data between a data tag and a database application using a mapping interface, the program comprising instructions operable to cause the computer to perform:

communicating with the data tag via a wireless interface using a data tag query protocol;

communicating with the database application via a database interface using a database query protocol;

reading a mapping definition; and exchanging data between the wireless interface and the database interface by mapping between the data tag query protocol and the database query protocol using the mapping definition, the mapping being performed in the mapping interface;

wherein the mapping definition is stored separately from the mapping interface.

* * * * *

UNITED STATES PATENT AND TRADEMARK OFFICE
CERTIFICATE OF CORRECTION

| | | |
|---|---|---|
| PATENT NO. | : 7,248,168 B2 | Page 1 of 1 |
| APPLICATION NO. | : 10/873837 | |
| DATED | : July 24, 2007 | |
| INVENTOR(S) | : Gordon Muehl, Karsten Hinrichs and Jens Staeck | |

It is certified that error appears in the above-identified patent and that said Letters Patent is hereby corrected as shown below:

Col. 16, Line 25

Delete "cuery" and Insert -- query --
Delete "ciurv" and Insert -- query --

Col. 17, Line 12

Delete "confiaured" and Insert -- configured --

Signed and Sealed this

Thirtieth Day of October, 2007

JON W. DUDAS
*Director of the United States Patent and Trademark Office*

UNITED STATES PATENT AND TRADEMARK OFFICE
CERTIFICATE OF CORRECTION

PATENT NO. : 7,248,168 B2  Page 1 of 1
APPLICATION NO. : 10/873837
DATED : July 24, 2007
INVENTOR(S) : Gordon Muehl, Karsten Hinrichs and Jens Staeck It is certified that error appears in the above-identified patent and that said Letters Patent is hereby corrected as shown below:

Column 16, Line 25

Delete "cuery" and Insert -- query --
Delete "ciurv" and Insert -- query --

Column 17, Line 12

Delete "confiaured" and Insert -- configured --

Signed and Sealed this

Twentieth Day of November, 2007

JON W. DUDAS
*Director of the United States Patent and Trademark Office*